United States Patent [19]

Beatenbough et al.

[11] Patent Number: 5,031,924
[45] Date of Patent: Jul. 16, 1991

[54] TWIST INDICATOR GASKET

[75] Inventors: Paul K. Beatenbough, Medina, N.Y.; Lavoyce G. Dey, Youngsville, Pa.; David J. Twichell, Ashville, N.Y.

[73] Assignee: Blackstone Corporation, Jamestown, N.Y.

[21] Appl. No.: 443,254

[22] Filed: Nov. 30, 1989

[51] Int. Cl.5 .......................... F16J 15/00; F28S 9/02
[52] U.S. Cl. ............................ 277/207 R; 277/2; 165/173
[58] Field of Search ............... 277/207 R, 2, 9.5, 11, 277/208, 211; 165/173; 123/195 C

[56] References Cited

U.S. PATENT DOCUMENTS

| | | | |
|---|---|---|---|
| 2,615,741 | 10/1952 | Nathan | 277/208 |
| 2,945,715 | 7/1960 | Burrell | 277/208 |
| 4,817,967 | 4/1989 | Belter | 277/207 R |

FOREIGN PATENT DOCUMENTS

| | | | |
|---|---|---|---|
| 0096995 | 6/1983 | Japan | 165/173 |
| 0150255 | 9/1920 | United Kingdom | 277/211 |

Primary Examiner—William A. Cuchlinski, Jr.
Assistant Examiner—Daniel G. DePumpo
Attorney, Agent, or Firm—Bean, Kauffman & Spencer

[57] ABSTRACT

A gasket and method for detecting the status of an installed gasket is disclosed, wherein the gasket comprises a series of protruding projections which vary from a visually detectable, defined direction when installed improperly. This invention has particular utility in manufacturing operations where improper gasket installation is difficult to detect during assembly, particularly in the automotive heat exchanger industry.

13 Claims, 1 Drawing Sheet

TWIST INDICATOR GASKET

This invention relates to gaskets, particularly to sealing gaskets used in assemblies wherein a gasket twisted upon itself can defeat the seal and is difficult to detect during the assembly procedure. This invention has particular utility in the assembly of tanks to headers in the automotive radiator industry.

BACKGROUND OF THE INVENTION

The assurance of an adequate gasket seal in the assembling of components is a source of problems in many industries. In many instances, the problems can be directly traced to the location of the gasket seal, the difficulty of maintaining the gasket in place during the assembling procedure and the difficulty of determining thereafter whether or not the gasket has remained in place during assembly. Many times a gasket is installed early in the assembly procedure and there is no simple or quick means to assure the adequacy of the seal until substantial additional assembly has occurred. Improper installation of such gaskets can result in significant material and time losses.

In one typical gasket seal arrangement, a gasket is fitted into a receptacle, race or groove of a first component and a second component is connected to the first component such that the gasket acts as a seal therebetween. When the gasket is properly installed and the components properly assembled the seal arrangement is very adequate for a wide variety of applications. Especially in assembly operations where the gasket is round, oval or rectangular in cross section, it is not infrequent that a gasket may be improperly installed so that it is twisted, or, that during the assembly of components the properly installed gasket becomes twisted so that the seal becomes defective for the purpose intended.

Much of the time an improper installation is unnoticed by the installer because of a difficulty in detection. A twisted gasket may not be readily visible, particularly on an assembly line where the speed of accomplishing a task is of primary importance. Further, some assembly procedures can cause the gasket to twist because of unusual strains placed upon the gasket, which twisting is not typically readily visible and apparent to the assembler.

In the automotive heat exchanger industry, plastic header tanks are typically assembled around the periphery of a metal radiator header sheet. The assembly is such that the metal header sheet typically comprises a gasket accepting slot or recess about its periphery, an elastomeric gasket is inserted into the slot or recess and the foot of the plastic header tank rests on the gasket. The plastic header tank is typically forced into the gasket bearing slot during assembly, deflecting the gasket a desired proportion of its undeflected height, and the header tank is retained in the slot. Because of the configuration of various retaining means, it may further be desirable for the gasket to be placed nearer the inner or outer wall of the gasket accepting slot or recess or at a controlled intermediate position between the inner and outer walls. During assembly it is not unusual for the elastomeric gasket to become twisted and because of the visual difficulty of seeing within the slot during assembly, such twisted gaskets may go undetected until testing of the completely assembled heat exchanger.

One object of this invention is to provide a means for increasing the detectability of twisted gaskets during assembly of gasket sealed components.

Another object of this invention is to provide a novel gasket having twist detection means.

A further object of this invention is to provide a novel gasket with gasket placement means.

A still further object is to provide a method for determining whether a gasket has twisted during installation or assembly.

These and other objects are achieved by the invention described as follows:

SUMMARY OF THE INVENTION

The novel gasket of the invention comprises a gasket having compression surfaces and a detection surface, said detection surface having a plurality of generally equally spaced projections extending in series therefrom, spaced and configured to visually appear as a segmented border extending in a defined direction, particularly when said gasket is properly installed and compressed.

The novel method of the invention comprises providing a gasket having generally equally spaced projections extending in series from a surface thereof, said projections being spaced and configured to visually appear as a segmented border extending in defined direction; installing said gasket in a first component; visually observing the direction of the segmented border and comparing the observed direction to the defined direction. The method further provides for assembling a second component to the first component, in gasket sealed relationship, visually observing the direction of the segmented border and comparing the observed direction to the defined direction.

By the term compression surface is meant a surface of the gasket which contacts one or more surfaces of the components of the assembly which are to be sealed by the gasket. Typically gaskets have opposing compression surfaces with side surfaces that may or may not participate in the sealing process. A flat gasket usually has opposing compression surfaces which are deflected toward each other during the assembly to form the required seal between the components with the side surfaces not substantially participating in the sealing process. Round, oval and rectangular gaskets are usually installed in slots, recesses or the like and two, three or all of the surfaces may be deflected to participate in the sealing process. The invention disclosed herein has utility with each of the above gaskets providing at least one visible surface or edge thereof can comprise segmented projections without significantly affecting the sealing process. The projections of one surface can be configured differently from that of the other and projections can be of varying configuration.

By the term detection surface is meant any surface of the gasket which is visible during and/or after installation of the gasket and/or assembly of the components of the device being gasketed. A detection surface typically is a side surface of the gasket adjacent to a compression surface, or may be a part of or extension of the compression surface. The detection surface may be an edge, for example an edge between a compression surface and a side surface or can extend from a compression surface to a side surface.

DETAILED DESCRIPTION OF THE INVENTION

An exemplary embodiment of an automotive heat exchanger assembly gasket made according to the invention is illustrated in the figures. It should be understood however that the present invention can be utilized in a plurality of other gaskets used in other assemblies.

Figure 1:
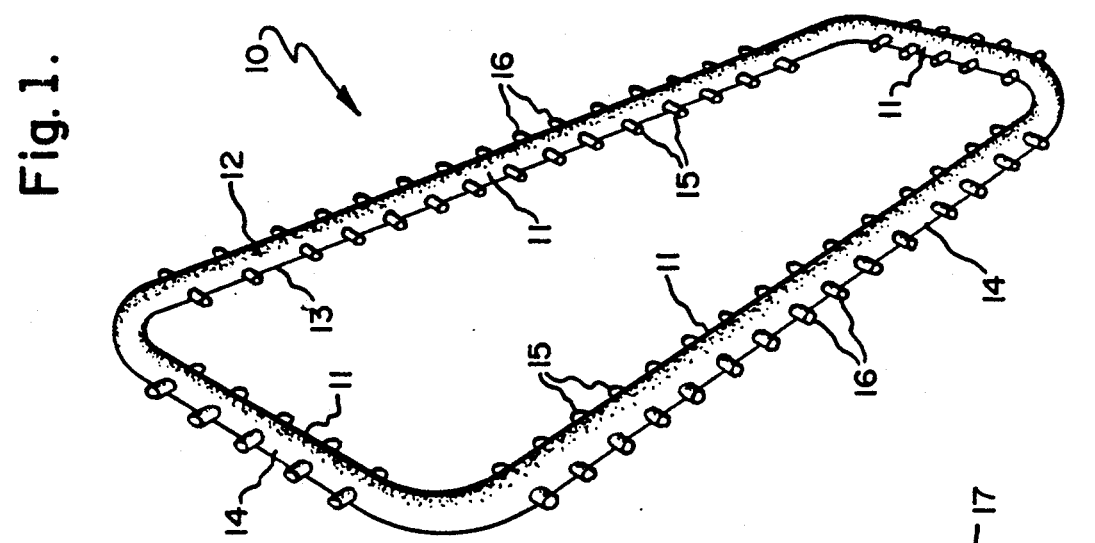
FIG. 1 is a perspective view of a gasket made in accordance with the present invention.

FIG. 1, comprises a perspective view of one embodiment of the invention. Therein, rectangular gasket 10 is formed from an elastomeric material and has a generally round cross-section, comprising interior detection surface 11, compression surfaces 12 and 13, and exterior detection surface 14. Extending along interior detection surface 11 of the gasket are a series of cylindrical shaped projections 15, arranged to visually appear as being in a continuous, generally straight, direction. Similarly, along exterior detection surface 14 of the gasket extend a series of cylindrical shaped projections 16, arranged to visually appear as being in a continuous, generally straight, direction. As should be apparent, in the event the round gasket is twisted, the visual appearance in direction of either or both of projections 15 or 16 will change to appear as a twisting direction.

Figure 2:
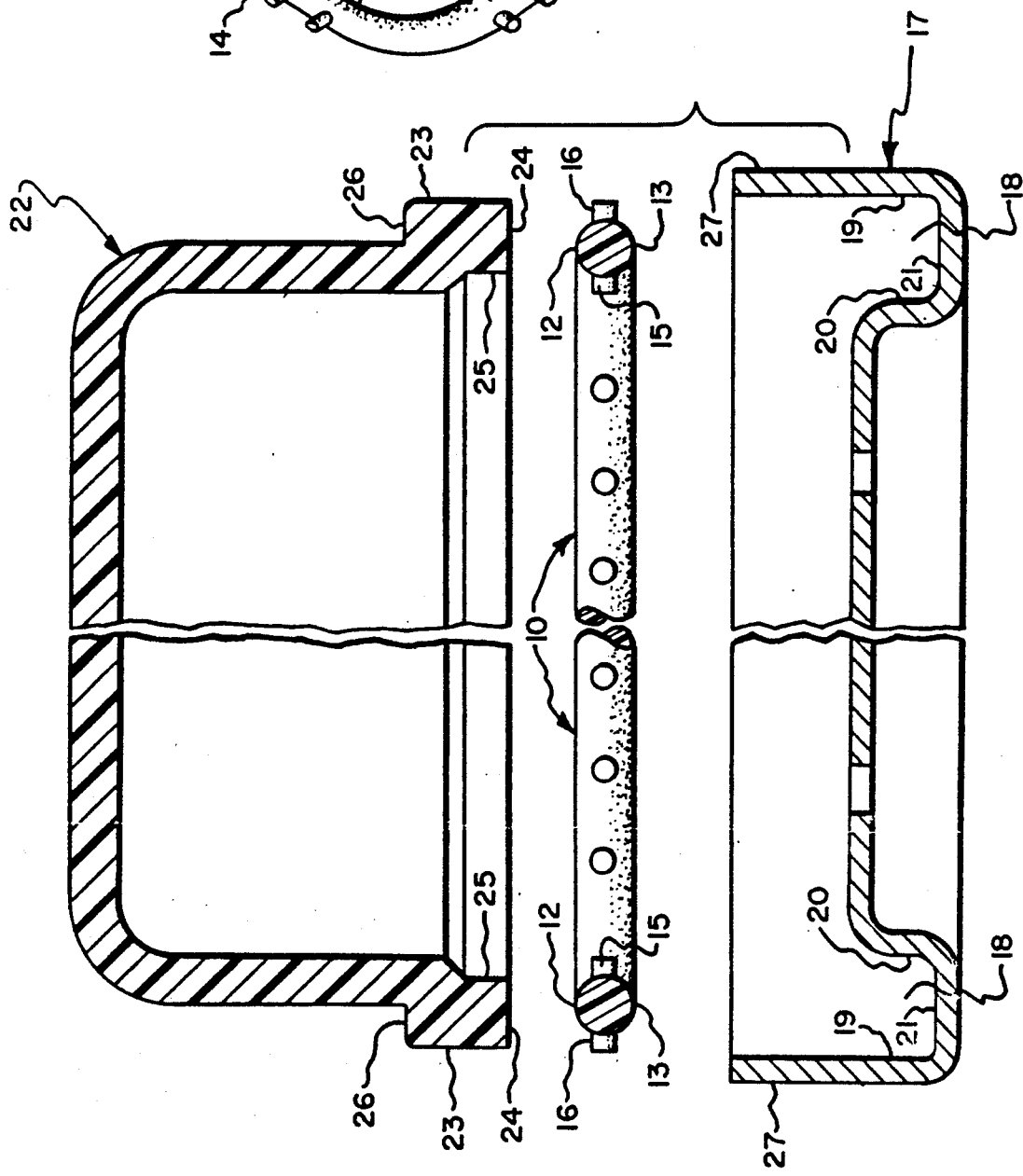
FIG. 2 is an exploded, sectioned plan view of an automotive heat exchanger assembly containing the gasket of FIG. 1.

FIG. 2, comprises a plan view of an automotive heat exchanger assembly in which the gasket might be utilized. Therein, heat exchanger header sheet 17, comprises attachment slot 18, in which gasket 10 is inserted. Compression surface 13 of gasket 10 rests against lower slot surface 21, while interior projections 15 and exterior projections 16 are adjacent to sides 20 and 19 respectively of slot 18. Header tank 22 is assembled such that surface 24 compressingly engages compression surface 12 of gasket 10 inwardly toward compression surface 13, with side 23 of the header tank adjacent side 19 of the slot and side 25 adjacent side 20 of the slot. Ends 27 of the header sheet are crimped over surfaces 26 of the header tank to compressingly engage header tank 22 to header 17 during assembly.

During assembly of gasket 10 into slot 18 of header sheet 17, any twisting of the gasket is readily visible to the assembler through observation of the direction of the interior and/or exterior projections. During assembly of header tank 22 to the gasket fitted header sheet 17, any twisting of the gasket is readily visible looking downwardly along side 19 of the header at exterior projections 16, or alternately, through an appropriate opening in the tank looking downwardly at interior projections 15 along side 20 of slot 18.

The projections can also act to determine position of the gasket compression surfaces laterally in the slot. For example, the projections might extend laterally a selected distance from the body of the gasket, thus acting to fix the gasket at a particular position laterally relative to the width of the slot. Generally it has been found that gaskets, intended to be used between a header tank and a header sheet of an automotive heat exchanger assembly in accordance with the invention, preferably comprise projections having a distance between centers thereof less than about 2 inches. A most preferred embodiment comprises projections having a distance between centers thereof less than about 0.8 inches.

We claim:

1. A gasket comprising compression surfaces, said compression surfaces arranged to engage surfaces of components of an assembly to form a seal, and a detection surface, said detection surface not forming the primary seal between said surfaces of components of an assembly and having a plurality of generally equally spaced projections extending in series from said detection surface, said projections being spaced and configured to visually appear as a segmented border extending in a defined direction.

2. A gasket of claim 1 wherein said projections are generally uniform.

3. A gasket of claim 2 wherein said projections are cylindrical in configuration.

4. A gasket of claim 2 formed from an elastomer material.

5. A gasket of claim 3 formed from an elastomer material, and wherein said defined direction is in a generally straight line about an exterior assembly surface of the gasket.

6. A gasket of claim 5 wherein said exterior assembly surface is contiguous with a compression surface and wherein said gasket is oval or round.

7. A gasket of claim 1, formed from an elastomeric material, wherein said defined direction is generally directed outward from an exterior perimeter of the gasket and is in a plane generally parallel to a plane of a compression surface.

8. A gasket of claim 1, formed from an elastomeric material, wherein said defined direction is generally directed outward from an interior perimeter of the gasket and is in a plane generally parallel to a plane of a compression surface.

9. A gasket of claim 1 comprising two detection surfaces wherein each said detection surface has a plurality of generally equally spaced projections extending in series therefrom, said projections being spaced and configured to visually appear as a segmented border extending in a defined direction.

10. A gasket of claim 9 wherein the projections of one detection surface are configured differently from that of the other.

11. A gasket of claim 1 wherein said projections are of varying configuration.

12. A gasket of claim 1 wherein said projections extend a predetermined dimension from said detection surface, which dimension relates to lateral positioning of the gasket.

13. A gasket of claim 1 in combination with a header tank and a heat exchanger header sheet forming an automotive heat exchanger assembly.

* * * * *